Patented Dec. 5, 1922.

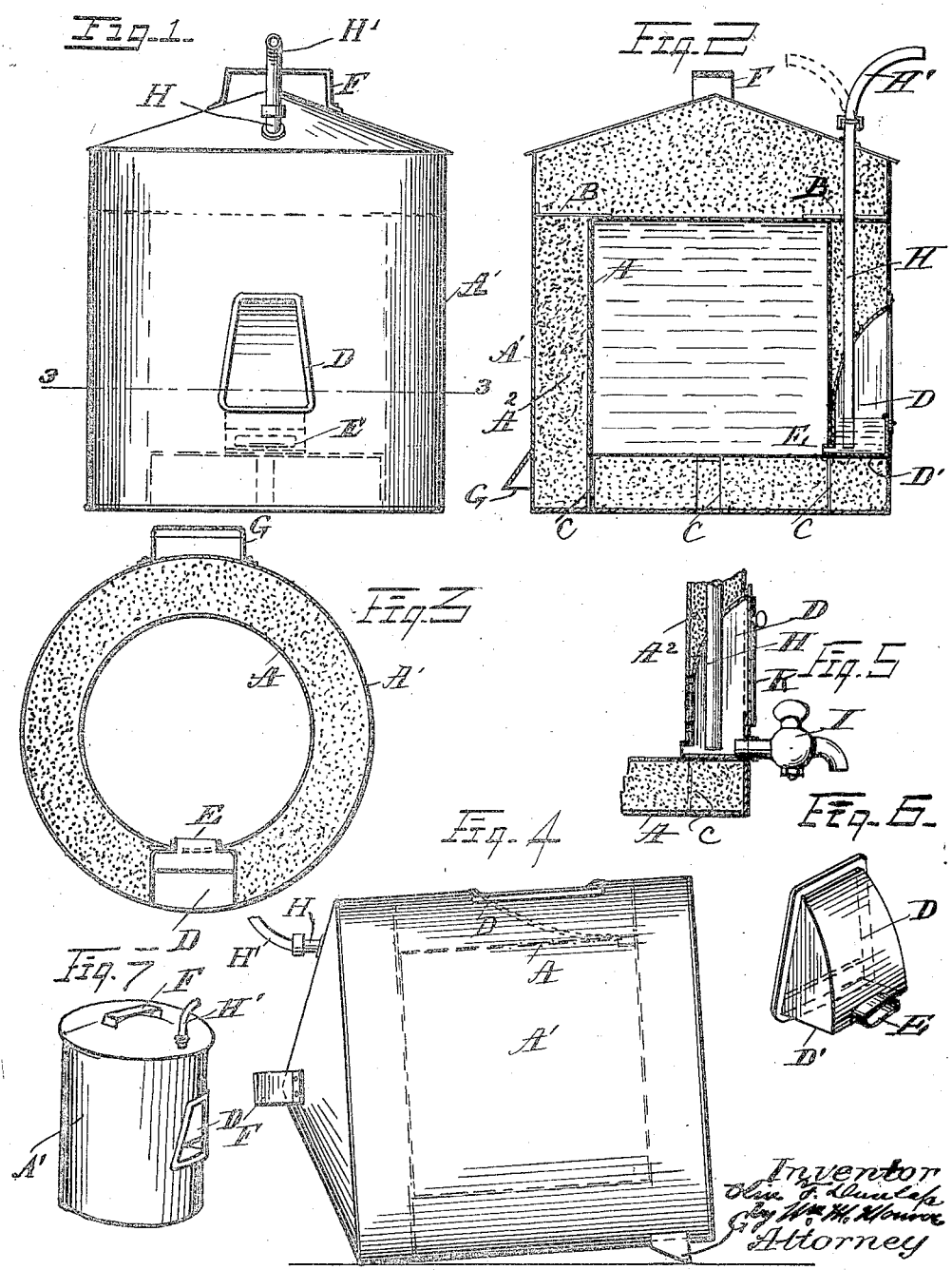

1,437,729

UNITED STATES PATENT OFFICE.

OLIN F. DUNLAP, OF NEW LONDON, OHIO.

DRINKING FOUNTAIN.

Application filed May 15, 1919. Serial No. 297,281.

*To all whom it may concern:*

Be it known that I, OLIN F. DUNLAP, a citizen of the United States, and resident of New London, in the county of Huron and State of Ohio, have invented certain new and useful Improvements in Drinking Fountains, of which I hereby declare the following to be a full, clear, and exact description, such as will enable others skilled in the art to which it appertains to make and use the same.

The objects of the invention are to provide a drinking fountain for poultry that will be safe against freezing in cold weather, and the same construction affords equally good service in keeping drinking water cool and in good sanitary condition in extreme summer heat. The same principle of structure is also adapted for a drinking fountain for men and animals and the size, shape and general construction may be varied without departing from the underlying principle of operation or general proportion of the device.

The invention is exemplified in its use for poultry, since such changes as will adapt it for other uses will be negligible, and the invention is hereinafter further described shown in the accompanying drawings, and specifically pointed out in the claims.

In the drawings, Fig. 1 is a front elevation of the fountain,

Fig. 2 is a central vertical section from front to rear of the fountain.

Fig. 3 is a cross section taken longitudinally at 3—3, in Fig. 1,

Fig. 4 shows the fountain in position for filling.

Fig. 5 is a detail view of a modified form.

Fig. 6 is a perspective of the drinking cup, Fig. 7 is a perspective of the entire fountain.

In Fig. 1, the position of the water reservoir is shown in dotted lines and the position of the drinking opening is shown.

In Fig. 2, the relation of the drinking cavity to the main reservoir is shown, and also the manner in which the drinking cavity is protected by being built into the outer case instead of projecting therefrom. It also shows how the poultry can drink from the fountain without danger of wetting their wattles.

Referring to the drawings, the device is shown to comprise first an inner supply reservoir, A, surrounded by a casing A' of similar shape, but of considerably larger dimensions to provide an annular chamber or space $A^2$, on all sides of the reservoir when the reservoir is suspended within the casing and the space so provided is filled with suitable insulating material.

It is evident therefore that if the inner reservoir is filled with warm or hot water in winter, it will lose its heat very slowly even in the most severe cold weather, and conversely, if filled with cold water in summer, the contents will remain cool for a long period of time even when exposed to the direct rays of the sun. A drinking cup or small recess D, to which the poultry can find ready access through the opening in the exterior casing A', and having its bottom D' on a level with the bottom of the reservoir, is inserted wholly within the space $A^2$ between the reservoir and casing. Hence a very small amount of the fluid is exposed to the outer air, or outside influences of any kind, and also the close connection of the drinking cup or space through a relatively small opening E at its bottom maintains a free circulation between the cup and reservoir when there is the slightest difference in temperature between the two bodies of fluid. For this reason the fluid in the cup can not freeze until the temperature of the entire body of fluid in the reservoir falls nearly to the freezing point. Also by filling the reservoir with cold water in summer the contents will remain cool for an indefinite period of time, by means of the same action.

The operation of the device is automatic to keep the cup full of fluid, and is accomplished by the well known principle that when the water in the cup is lowered to the end of the opening E at the level of the floor of the reservoir and cup, bubbles of air will pass through the opening into the reservoir and permit a sufficient amount of liquid to pass thru to again cover the opening, sealing it against further entrance of air until the liquid is again drawn down when the same action will again be repeated until all of the water is drawn out of the reservoir. The rear wall of the drinking cup D is arched to permit the cup to be filled when lying in the inclined position shown in Fig. 4.

In Fig. 2 braces B and feet C are shown to support the reservoir centrally in the casing. The cup D is funnel shaped and forms a close fit at the points of engagement to prevent the escape of the fluid, also H is a drinking tube by means of which persons can draw the water to drink if desired. A faucet I can also be used for this purpose if desired.

When this device is used in the field for a person's drinking the upper part can be turned aside after use at H' if so used a cover K over the recess D prevents fowels or dogs from drinking.

Having described the invention what I claim as new and desire to secure by Letters Patent is:—

1. The combination with a drinking fountain, said fountain having a double wall and insulation between the opposed sides of said wall, the outer of said walls having an opening near its base and the inner wall having a smaller opening, of an insertable drinking cup, said cup having an arched back, a flat bottom, and a vertical raised front edge, and also provided with a tubular projection in the rear, said drinking cup inserted in the opening in said front wall and the tubular projection in the rear inserted in the aforesaid opening in said inner wall.

2. The combination with a drinking fountain having an insulated wall of a drinking cup inserted therein adjacent to the base thereof, said drinking cup having an arched back, a flat bottom, and a raised front edge, and a rear opening at the base communicating with the interior of said fountain, and a drinking tube inserted through the vertical walls of said fountain and into the lower part of said cup behind said raised front edge substantially as and for the purpose described.

3. The combination with a drinking fountain having a double wall and insulation between the opposed sides of said wall, of a drinking cup wholly inserted in said wall and insulation, and having a rear opening adjacent to its bottom communicating with the interior of said fountain, said drinking cup open in front and provided with a raised front edge, and a drinking tube inserted through said insulated wall and entering said cup, and a swivelled mouth-piece for said drinking tube.

In testimony whereof, I hereunto set my hand this 25th day of March 1919.

OLIN F. DUNLAP.

In presence of—
J. H. SACKETT, Sr.,
WM. M. MONROE.